United States Patent
Mitsumori et al.

(10) Patent No.: US 10,033,877 B2
(45) Date of Patent: *Jul. 24, 2018

(54) SYSTEM AND METHOD FOR MONITORING COMMUNICATIONS IN A NETWORK

(71) Applicant: LEVEL 3 COMMUNICATIONS, LLC, Broomfield, CO (US)

(72) Inventors: Derek Mitsumori, Lexington, MA (US); Michael Baj, Newton, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,771

(22) Filed: Feb. 27, 2017

(65) Prior Publication Data

US 2017/0171397 A1   Jun. 15, 2017

Related U.S. Application Data

(63) Continuation of application No. 14/537,778, filed on Nov. 10, 2014, now Pat. No. 9,591,468, which is a continuation of application No. 12/804,706, filed on Jul. 26, 2010, now Pat. No. 8,885,494, which is a continuation of application No. 10/629,521, filed on Jul. 29, 2003, now Pat. No. 7,764,670.

(51) Int. Cl.
*H04M 15/00* (2006.01)
*H04W 4/24* (2018.01)
*H04L 12/14* (2006.01)

(52) U.S. Cl.
CPC ........ *H04M 15/56* (2013.01); *H04L 12/1482* (2013.01); *H04M 15/8214* (2013.01); *H04W 4/24* (2013.01)

(58) Field of Classification Search
CPC ..... H04L 12/14; H04L 41/0893; H04L 47/20; H04L 47/10; H04L 47/14; H04L 47/2416; H04L 47/2483; H04L 12/1407; H04L 12/1417; H04L 12/1435; H04L 12/1485; H04L 1/20; H04L 41/0806; H04L 63/306
See application file for complete search history.

(56) References Cited

U.S. PATENT DOCUMENTS

| | | |
|---|---|---|
| 5,430,709 A | 7/1995 | Galloway |
| 6,102,970 A | 8/2000 | Kneipp |
| 6,252,952 B1 | 6/2001 | Kung et al. |
| 6,317,490 B1 | 11/2001 | Cameron et al. |
| 6,516,056 B1 | 2/2003 | Justice et al. |

(Continued)

OTHER PUBLICATIONS

International Search Report and Written Opinion, dated Feb. 8, 2006, Int'l Appl. No. PCT/US04/024816, Int'l Filing Date Jul. 29, 2004, 6 pgs.

(Continued)

*Primary Examiner* — Kwasi Karikari

(57) ABSTRACT

Methods and systems are described for monitoring communications in a packet-switched network. More specifically, the system initiates a communication between a network endpoint associated with a call mediator and at least a second network endpoint; records, at the call mediator, information associated with the communication; and upon termination of the communication, communicates, from the call mediator to an enterprise gatekeeper, the information associated with the communication.

16 Claims, 5 Drawing Sheets

(56) References Cited

U.S. PATENT DOCUMENTS

| | | |
|---|---|---|
| 6,674,852 B1 | 1/2004 | Hamilton |
| 6,763,376 B1 | 7/2004 | Devine |
| 6,909,708 B1 | 6/2005 | Krishnaswamy et al. |
| 7,099,301 B1 | 8/2006 | Sheu |
| 7,197,640 B2 | 3/2007 | Meisel |
| 7,283,521 B1 * | 10/2007 | Ryan .................. H04M 3/2281 370/230 |
| 7,843,902 B2 | 11/2010 | Imbimbo et al. |
| 2002/0001302 A1 | 1/2002 | Pickett |
| 2002/0051041 A1 | 5/2002 | Takagi |
| 2003/0081593 A1 | 5/2003 | Yoo |
| 2003/0120773 A1 | 6/2003 | Mueller et al. |
| 2003/0193961 A1 | 10/2003 | Moore et al. |
| 2004/0017905 A1 | 1/2004 | Warrier et al. |
| 2004/0156495 A1 | 8/2004 | Chava et al. |
| 2004/0255154 A1 | 12/2004 | Kwan et al. |
| 2005/0018829 A1 | 1/2005 | Baker |
| 2005/0074101 A1 | 4/2005 | Moore et al. |
| 2005/0094651 A1 | 5/2005 | Lutz et al. |
| 2005/0213567 A1 | 9/2005 | Mullins et al. |
| 2010/0086119 A1 * | 4/2010 | De Luca ............. H04M 3/2281 379/213.01 |
| 2010/0296408 A1 | 11/2010 | Mitsumori et al. |
| 2015/0074396 A1 | 3/2015 | Naslunc et al. |
| 2016/0249197 A9 | 8/2016 | Mitsumori et al. |

OTHER PUBLICATIONS

Supplementary European Search Report, dated Aug. 16, 2007, Application No. 04779768.3, filed Jul. 29, 2004, 3 pgs.

\* cited by examiner

SYSTEM AND METHOD FOR MONITORING COMMUNICATIONS IN A NETWORK

RELATED APPLICATIONS

This application is a continuation of and claims the benefit of priority to U.S. patent application Ser. No. 14/537,778, entitled "SYSTEM AND METHOD FOR MONITORING COMMUNICATIONS IN A NETWORK," filed Nov. 10, 2014, which is incorporated by reference herein in its entirety for all purposes. Application Ser. No. 14/537,778 is a continuation of and claims the benefit of priority to U.S. patent application Ser. No. 12/804,706, entitled "SYSTEM AND METHOD FOR MONITORING COMMUNICATIONS IN A NETWORK," filed Jul. 26, 2010 (now U.S. Pat. No. 8,885,494, issued Nov. 11, 2014), which is incorporated by reference herein in its entirety for all purposes. Application Ser. No. 12/804,706 is a continuation of and claims the benefit of priority to U.S. patent application Ser. No. 10/629,521, entitled "SYSTEM AND METHOD FOR MONITORING COMMUNICATIONS IN A NETWORK," filed Jul. 29, 2003 (now U.S. Pat. No. 7,764,670, issued Jul. 27, 2010), which is incorporated by reference herein in its entirety for all purposes. This application is related to the following commonly owned patents and pending applications, each of which is hereby incorporated herein by reference in its entirety:

U.S. patent application Ser. No. 09/827,352, entitled, "ALTERNATE ROUTING OF VOICE COMMUNICATIONS IN A PACKET-BASED NETWORK", filed Apr. 6, 2001 (now U.S. Pat. No. 7,339,934, issued Mar. 4, 2008); and U.S. patent application Ser. No. 10/629,517, entitled, "SYSTEM AND METHOD FOR PROVIDING ALTERNATE ROUTING IN A NETWORK," filed Jul. 29, 2003 (now U.S. Pat. No. 7,215,643, issued May 8, 2007).

BACKGROUND OF THE INVENTION

The invention disclosed herein relates generally to providing monitoring functionality in a communications network. More particularly, the present invention relates to monitoring packet-switched communications, such as Voice over Internet Protocol ("VoIP") calls, to provide enhanced call detail information which can be used for billing purposes, quality of service ("QoS") monitoring, network usage tracking, and other similar purposes.

In conventional packet-switched networks, communications between network endpoints are generally facilitated and managed by call mediators and enterprise gatekeepers. Traditionally, a VoIP network endpoint is associated with a call mediator that is responsible for processing calls to and from the VoIP network endpoint. The call mediator in turn, uses H.323 signaling techniques or other protocols to communicate with an enterprise gatekeeper that is responsible for routing calls between call mediators in the enterprise.

While network endpoints and call mediators are generally located at customer sites, the enterprise gatekeeper for these systems generally resides offsite. Thus, a common application service provider scenario is a company managing its own call mediator(s) and network endpoints in a particular office, such as a branch office, and contracting with an entirely different company to provide packet-switched network services and to manage the enterprise gatekeeper(s) associated with the packet-switched network. In some cases, however, companies maintain their own networks entirely having local endpoints, gatekeepers, and other system components that are part of their overall VoIP network.

When a communication occurs between two network endpoints, the call mediators associated with the endpoints are typically responsible for recording and storing details associated with the communication including, but not limited to the identity of the endpoints associated with a call, the start and stop times of a call, QoS metrics associated with a call, a cause code indicating why the communication terminated, and other similar information.

In commercial applications, these communication details are later used to generate customer bills based on network usage and other business factors. When a system generates a customer bill, a billing server or other similar transaction processing module queries the various call mediators throughout the network to provide the communication details associated with the customer that the call mediators have stored. Sometimes, call mediators also push this data to the billing server or other similar transaction processing module. The communication details are then aggregated and used to create the bill.

One problem associated with this method for service providers is that the billing system relies on data that is controlled by and stored at a customer. Thus, there some risk of fraud associated with relying on unverified data. Further, retrieving communication details from many different call mediators is resource intensive and inefficient. In addition, in some cases, call mediators store some communication details in formats that are not suited for processing by a given billing system. Finally, cases arise where communications are routed beyond call mediators, such as via the PSTN to endpoints located beyond a customer's site or network, and thus call mediators are not well-suited to capturing communication details associated with circuit-switched networks.

There is thus a need for systems and methods that provide more reliable communication details to billing systems in packet-switched networks. There is also a need to make this information efficiently accessible and stored in formats suitable for processing by billing systems.

SUMMARY OF THE INVENTION

The present invention addresses, among other things, the problems discussed above monitoring communications in a packet-switched network.

In accordance with some aspects of the present invention, computerized methods are provided for initiating a communication between a network endpoint associated with a call mediator and at least a second network endpoint, recording information associated with the communication at the call mediator, and upon termination of the communication communicating the information associated with the communication from the call mediator to an enterprise gatekeeper. In some embodiments of the invention, the communication comprises a VoIP communication.

Various different information associated with the communication is recorded according to different embodiments of the invention. For example, in some embodiments, the information associated with the communication includes a network identifier associated with a network endpoint, the start time of the communication, the stop time of the communication, the duration of the communication, an amount of data transferred between the network endpoints, or a termination cause code. In some embodiments, the termination code an alphanumeric termination cause code that may, at times, be translated into a numeric termination cause code, such as a PSTN numeric termination cause code. In some embodiments, the alphanumeric termination cause code is translated by the enterprise gatekeeper.

In some embodiments, the information associated with the communication comprises is associated with a disconnect request. For example, in some embodiments, a billing token or other similar data structure contained in a disconnect request contains the information associated with the communication. In some embodiments, the information associated with the communication is parsed to create an authentication record, such as a RADIUS record. In some embodiments, the authentication record is communicated from the enterprise gatekeeper to an a remote authentication server and parsed to create a billing call record. In some embodiments, the billing call record is communicated to a billing server for further processing.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION

Figure 1:
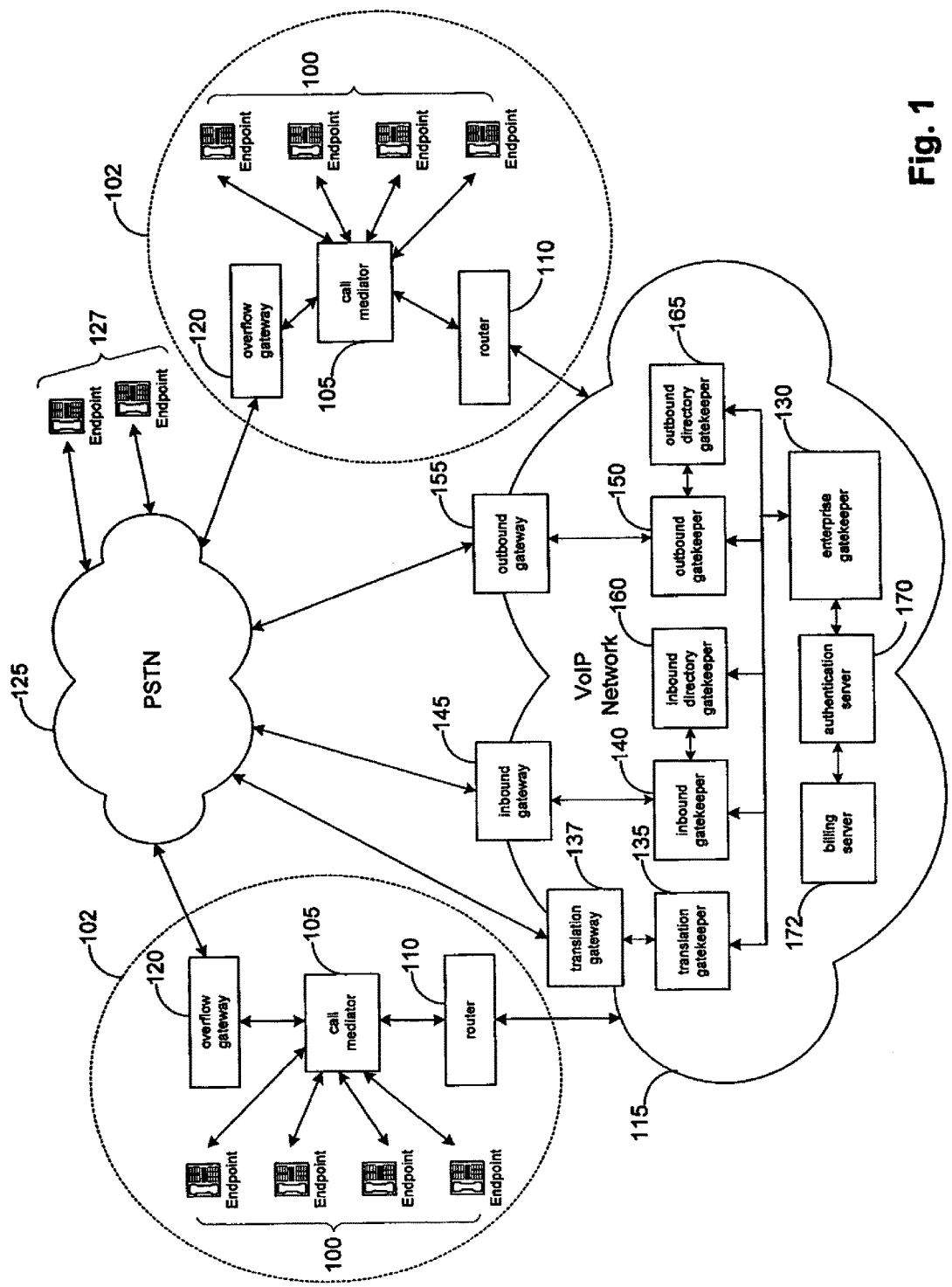
FIG. 1 presents a block diagram of an exemplary system for monitoring communications in a VoIP network according to one embodiment of the present invention.

With reference to FIGS. 1 through 3c, embodiments of the invention are presented. FIG. 1 presents a block diagram of an exemplary system for monitoring communications in a VoIP network according to one embodiment of the invention. Information associated with VoIP endpoint communications is recorded at call mediators and transmitted to an enterprise gatekeeper for further processing by billing systems and other network systems.

As shown, the system includes VoIP network endpoints 100 located at client sites 102, a call mediator 105, a router 110 connected to a packet-switched network such as a VoIP network 115, an overflow gateway 120 connected to a circuit-switched network 125 such as the PSTN, PSTN endpoints 127, an enterprise gatekeeper 130, a translation gatekeeper 135, a translation gateway 137, an inbound gatekeeper 140, an inbound gateway 145, an outbound gatekeeper 150, an outbound gateway 155, an inbound directory gatekeeper 160, an outbound directory gatekeeper 165, a remote authentication server 170, and a billing server 172.

A VoIP network endpoint 100 is generally a network node at a customer site 102 or other physical location comprising a network device suitable for conducting communications in a VoIP network, such as, a VoIP-enabled telephone handset, facsimile machine, video conferencing terminal, or other similar devices known in the art. In some embodiments, a VoIP network endpoint 100 may comprise a general-purpose computer with audio input and output capabilities suitable for conducting VoIP communications.

VoIP endpoints 100 generally maintain and execute client software to facilitate VoIP, as well as other types of communications. For example, according to one embodiment of the invention, VoIP endpoints 100 maintain and execute client software that adheres to the H.323 standard, which provides a foundation for audio, video, and data communications across IP-based networks 115. The H.323 standard and its related annexes, available from the H.323 Forum at www.h323forum.org and at the International Telecommunication Union at www.itu.int, is hereby incorporated herein by reference in its entirety. Additionally, H.323 is an umbrella standard that describes the architecture of the conferencing system and refers to a set of other standards (H.245, H.225.0, Q.931, and others) to describe its actual protocol. Alternatively, the system may be implemented using H.323 analogous signaling techniques and other methods associated with Session Initiation Protocol ("SIP"), Media Gateway Control Protocol ("MGCP"), or other well-known protocols for transporting voice and other related data over communications networks.

Each VoIP endpoint 100 is associated with one or more identifying network addresses. For example, in some embodiments a VoIP endpoints 100 is associated with an E.164 address as defined in the International Telecommunication Union's international public telecommunication numbering plan, available at http://www.itu.int/ITU-T/publications/index.html and hereby incorporated herein by reference in its entirety. Alternatively, in other embodiments, VoIP endpoints 100 are associated with IP addresses, H.323 IDs, SIP URLs, MGCP endpoint names, and other network address identifiers known in the art. In some embodiments, for example where a PBX is fronted by a VoIP gateway, endpoints may comprise digital or analog phones associated with E.164 addresses and other network address identifiers known in the art.

VoIP endpoints 100 are connected to a call mediator 105. The call mediator 105 is generally a software or hardware module, such as an IP-PBX, a PBX with a VoIP interface, a PBX fronted by a gateway, or other similar device that is generally responsible for handling intra-network communications. For example, the call mediator 105 generally handles calls between two endpoints 100 at the same enterprise site. The call mediator 105 is also generally responsible for presenting or otherwise delivering calls to other network elements in a private dialing plan ("PDP") format, in the PSTN-based format such as E.164 or prefixed-national, or other format suitable for routing through the VoIP network 115. In some embodiments, the call mediator 105 is located at a customer site 102 or other enterprise site and stores call data and other data regarding calls processed by the call mediator 105.

The call mediator 105 is connected to a circuit-switched network 125, such as the PSTN, via an overflow gateway 120. In some embodiments, such as with TDM PBX's and other PBXs, call mediators 105 and other system components may be connected directly to the PSTN without requiring an overflow gateway 120. Gateways, as described herein, generally function as an entrance or an exit to another network. Gateways, for example, translate IP-based communications to PSTN-based communications, or vice-versa, and serve as a bridge between these different network types. A gateway typically has a PSTN interface connected to the PSTN 125 and an IP interface connected a VoIP network 115. In some embodiments, as further described herein, gateways also translate numbers and other network addresses by expanding or otherwise manipulating PDP numbers or other similar numbers dialed into formats suitable for transmission on a particular network such as a PSTN 125 or a VOIP network 115.

The overflow gateway 120 enables the call mediator 105 to route calls directly to the PSTN 125 and to PSTN endpoints 127 by bypassing the VoIP network 115. PSTN endpoints 127 generally comprise but are not limited to traditional (non-VoIP) telephones, facsimile machines, and other similar devices known in the art. The call mediator 105 is connected to a packet-switched network 115, such as a VoIP network, via a router 110. Communications from the call mediator 105 to the VoIP network 115 are generally received by the enterprise gatekeeper 130 for further processing.

The enterprise gatekeeper 130 functions as a management component for facilitating VoIP communications and, among other things, is generally responsible for providing communication routing and control decisions to various elements of the system such as call mediators 105, translation gatekeepers 135, inbound gatekeepers 140, inbound gateways 145, outbound gatekeepers 150, outbound gateways 155, inbound directory gatekeepers 160, outbound directory gatekeepers 165, and other devices or software modules. According to embodiments of the invention, the enterprise gatekeeper 130 also functions in conjunction with various elements of the system such as call mediators 105, translation gatekeepers 135, inbound gatekeepers 140, inbound gateways 145, outbound gatekeepers 150, outbound gateways 155, inbound directory gatekeepers 160, outbound directory gatekeepers 165, and other devices or software modules to process and route communications between network endpoints as further described in application Ser. No. 10/629,517, titled SYSTEM AND METHOD FOR PROVIDING ALTERNATE ROUTING IN A NETWORK, filed Jul. 29, 2003, and in application Ser. No. 09/452,915, titled MULTISERVICE NETWORK, filed Dec. 1, 1999, both of which are hereby incorporated by reference in their entirety. For example, the enterprise gatekeeper 130, based on a called number received from a call mediator 105 and in conjunction with other system components, provides functionality to route the call to the IP address or other network identifying address of the destination endpoint 100.

The enterprise gatekeeper 130 is also generally connected to an authentication server 170 executing an authentication module comprising various combinations of hardware or software for controlling access to computer resources, enforcing policies, auditing usage, providing additional information which may be used to bill for services, and other useful functions. For example, in some embodiments, the authentication server 170 implements the Remote Authentication Dial-In User Service ("RADIUS") protocol to perform authentication services. The RADIUS protocol was initially developed by Lucent Technologies and further described in Request for Comments ("RFC") 2865 published by the Internet Engineering Task Force ("IETF") which is hereby incorporated herein by reference in its entirety and also available at http://www.ietf.org/rfc/rfc2865. txt.

The authentication server 170 is also generally in communication with a billing server 175 executing a billing module comprising various combinations of software or hardware for performing billing functions for the system. For example, the billing module tracks usage of system resources, call durations, and other factors to generate bills and perform other useful billing functions. In some embodiments, the authentication server 170 passes RADIUS records and other information regarding network and resource usage to the billing server 175 for use in performing billing functions.

Figure 2:
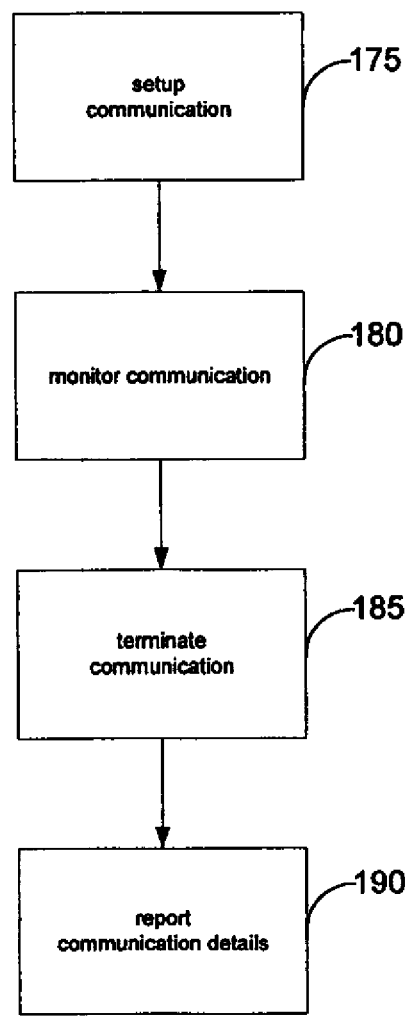
FIG. 2 presents a flow diagram of a method for monitoring communications in a VoIP network according to one embodiment of the present invention.

FIG. 2 presents a high-level flow diagram of a method for monitoring communications in a VoIP network according to one embodiment of the invention. The system performs a communication setup, step 175. For example, in some embodiments, the system performs a VoIP call setup between two network endpoints as further described in application Ser. No. 10/629,517, titled SYSTEM AND METHOD FOR PROVIDING ALTERNATE ROUTING IN A NETWORK, filed Jul. 29, 2003, which is hereby incorporated herein by reference in its entirety.

The communication is monitored, and details such as the duration of the communication, network resources used by the communication, bandwidth used by the communication, and other communication metrics are recorded, step 180. A variety of different network components perform monitoring, either singly or in combination according to various embodiments of the invention. For example, in some embodiments, components such as the call mediator(s), the enterprise gatekeeper, routers, endpoints, and other gatekeepers and gateways described in FIG. 1 monitor communications that pass through them or that they process and record the associated communication metrics.

The communication terminates, step 185, and the communication details are reported to a designated system component directed to processing the communication details, step 190. For example, a communication may terminate due to a network or network component failure, or a communication may terminate when a user or other process ends the communication. In some embodiments, communication details recorded by system components are aggregated or otherwise reported to an enterprise gatekeeper. The enterprise gatekeeper may process the communication details directly, perform preprocessing of the details, or send them to an authentication server, such as a RADIUS server, or billing server for processing. In some embodiments, the RADIUS server and the billing server operate in conjunction to process the communication details and generate a bill for the network resources or services used by the communication.

Figure 3A:
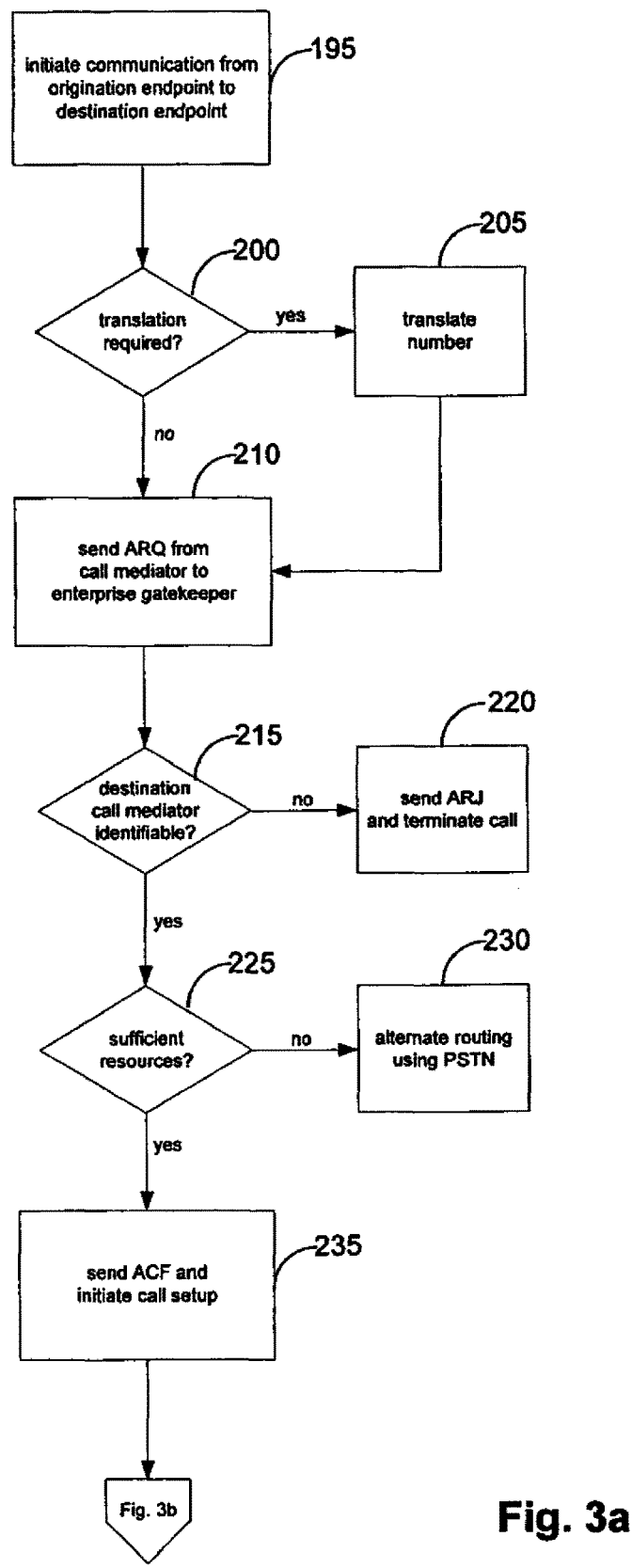
FIGS. 3a, 3b, and 3c present a series of flow diagrams illustrating a method for monitoring communications in a VoIP network according to one embodiment of the present invention.
Figure 3B:
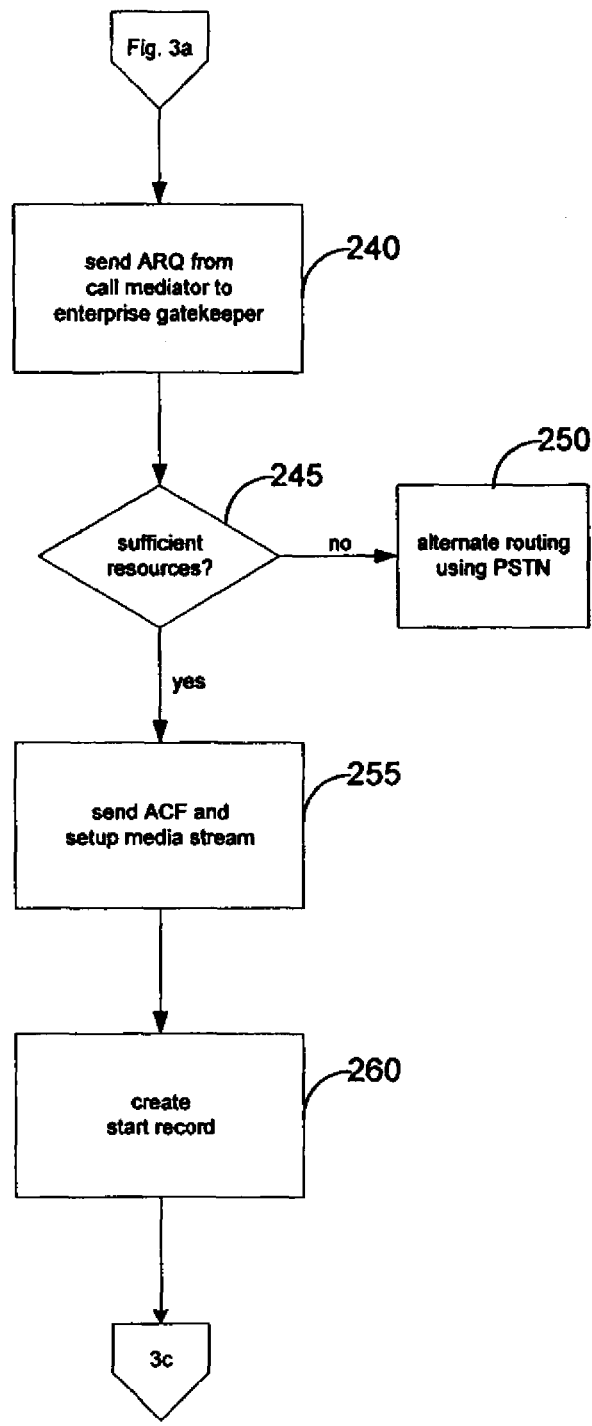
Figure 3C:
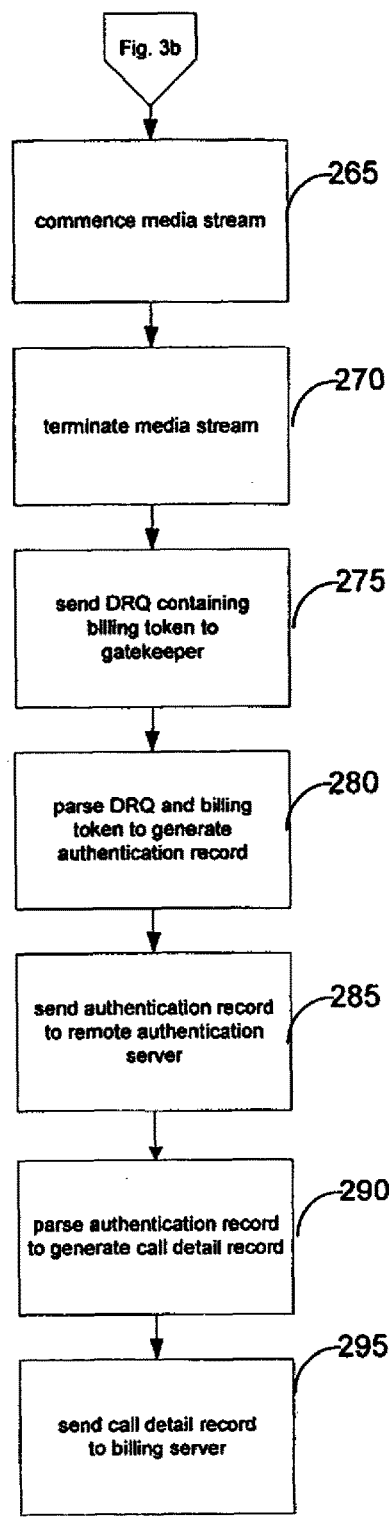

FIGS. 3a, 3b, and 3c present flow diagrams of a method for monitoring communications in a VoIP network according to one embodiment of the invention. A caller initiates a communication from an origination endpoint, such as a VoIP endpoint, to a destination endpoint, such as another VoIP endpoint or a PSTN endpoint, step 195. For example, a user could use a VoIP-enabled phone to dial a number directed to a traditional telephone on the PSTN or to a VoIP-enabled telephone connected to the VoIP network.

The call mediator determines whether the number or other network identifier, such as the IP address, of destination endpoint for the communication should be translated before being sent to the enterprise gatekeeper or other system components, step 200, and if necessary, translates the number into an appropriate format, step 205. Multiple call mediators from different enterprise sites or even different enterprises may share the services of the same enterprise gatekeeper and other system components. Thus, in some embodiments, the system requires a unique customer-specific identifier ("CSID") prepended to all private dialing plan numbers in order to identify the endpoints associated with the each specific call mediator. The CSID is used by the enterprise gatekeeper and other system components to distinguish between different customers, enterprises, sites, and call managers. Otherwise, for example, two different customers might be using the same numbers for their PDPs, and without the CSID, the enterprise gatekeeper receiving a PDP number such as "5678" would have difficulty distinguishing which customer's endpoint associated with "5678" was the actual intended recipient of a communication. CSIDs are thus associated with call mediators and stored in memory accessible to the enterprise gatekeeper. In some embodiments, the call mediator prepends a CSID to all calls before sending them to the enterprise gatekeeper.

Further, in some embodiments, the system also requires a technology prefix added to numbers that might be routed to other networks, such as the PSTN. For example, in some embodiments, the call mediator prepends a technology prefix such as "96#" to all numbers intended for the PSTN. The enterprise gateway and other elements recognize the technology prefix, and provide additional routing services as further described herein. In some embodiments, the call mediator also formats PDP numbers as an E.164 address so that, among other things, calls can be alternately routed to the PSTN to complete the communication as further described in application Ser. No. 10/629,517, titled SYSTEM AND METHOD FOR PROVIDING ALTERNATE ROUTING IN A NETWORK, filed Jul. 29, 2003.

As further described herein, the system uses a number of standards including H.323, H.225, H.245, and other signaling techniques known in the art to facilitate communications between system components. The call mediator sends an admission request ("ARQ") message to the enterprise gatekeeper requesting access to the VoIP network, step 210. The ARQ sent to the enterprise gatekeeper includes the number or other network identifier of the destination endpoint.

The enterprise gatekeeper either consulting network mappings by itself or in conjunction with an outbound directory gatekeeper determines whether a call mediator associated with the destination endpoint can be identified to route the call, step 215.

If a call mediator associated with the destination endpoint cannot be identified, then the enterprise gatekeeper returns an admission rejection ("ARJ") to the call mediator that sent the ARQ, and the call mediator either terminates the call or directly routes the call, if possible, via an overflow gateway to alternate network, such as a PSTN, step 220.

Otherwise, if a call mediator associated with the destination endpoint is identified, the enterprise gatekeeper determines, according to selection criteria, whether there are sufficient resources to setup the call via the VoIP network, step 225. In some embodiments, selection criteria include bandwidth exceeding a specified amount, availability of system components, and other criteria useful in determining whether to route a communication. For example, the enterprise gatekeeper might determine whether there is sufficient bandwidth available to enable a voice or other media stream at a specified minimal QoS. Alternatively, the system might check to ensure that various system resources such as gatekeepers, gateways, routers, and other system components were available to route the call to its intended destination.

If the enterprise gatekeeper determines that sufficient resources do not exist to setup the call, then the enterprise gatekeeper communicates an ARJ to the call mediator that the call cannot be routed via the VoIP network, and should be alternately routed via the PSTN as further described in application Ser. No. 10/629,517, titled SYSTEM AND METHOD FOR PROVIDING ALTERNATE ROUTING IN A NETWORK, filed Jul. 29, 2003, step 230. In some embodiments, the enterprise gatekeeper communicates an ARJ to the call mediator indicating that the call mediator is responsible for the call and that the communication should either fail or be routed by the call mediator via an overflow gateway directly to the PSTN using an alternate E.164 equivalent number or other similar number if available.

If sufficient resources exist, however, the enterprise gatekeeper sends to the call mediator associated with the origination endpoint an ACF containing the IP address or other identifying network address of the call mediator associated with the destination endpoint, and an H.245 media stream setup commences between the call mediator associated with the origination endpoint and the call mediator associated with the destination endpoint, step 235. The call mediator associated with the destination endpoint sends an ARQ to the enterprise gateway, step 240.

In some embodiments, the enterprise gatekeeper does not perform a second check to determine whether there are sufficient resources to setup the call using the VoIP network and control proceeds directly to step 255. In other embodiments (as shown in FIG. 3b), the enterprise gatekeeper again determines, according to selection criteria, whether there are sufficient resources to setup the call via the VoIP network, step 245. If the enterprise gatekeeper determines that sufficient resources do not exist to setup the call, then the enterprise gatekeeper communicates an ART to the call mediator associated with the destination endpoint that the call cannot be routed via the VoIP network, and should be alternately routed via the PSTN, step 250.

Otherwise, if sufficient resources exist, the enterprise gatekeeper sends an ACF to the call mediator associated with the destination endpoint, and an H.245 media stream setup commences between the call mediator associated with the origination endpoint and the call mediator associated with the destination endpoint, step 255.

The call mediator associated with the origination endpoint creates a start record that is sent to the enterprise gatekeeper, step 260. The start record indicates communication-related information such as start time of the communication, the network address of the originating endpoint, the network address of the destination endpoint, dialed numbers or other network identifiers associated with endpoints of the communication, and other similar information.

Continuing with FIG. 3c, the media stream commences between the two endpoints and their associated call mediators, step 265, and the communication continues until the media stream is terminated, step 270. For example, a communication may terminate when a user indicates that they are finished and that a call or communication should be disconnected. As another example, a communication may terminate due to a hardware or software failure that makes the system unable to continue the call. In some embodiments, a real time transport protocol ("RTP") voice stream or other media stream begins between the two call mediators, and the call mediators route the stream to their respective endpoints. RTP is a protocol that specifies a method for programs to manage transmission of multimedia data, and is further described in the IETF RFC 1889, available at http://www.ietf.org/rfc/rfc1889.txt, which is hereby incorporated herein by reference in its entirety.

When the communication terminates, the call mediator associated with the origination endpoint generates a disconnect request ("DRQ") containing a stop record or billing token that is sent to the enterprise gatekeeper, step 275. For example, in some embodiments, the billing token contains communication-related information such as the network addresses of the origination endpoint and the destination endpoint, any other network identifiers associated with the endpoints, the start time of the communication, the stop time of the communication, an amount of data transferred, protocols associated with the communication, session IDs associated with the communication, PDP numbers associated with network identifiers for endpoints, a termination cause code indicating the reason that the communication was disconnected, and other similar information. For example, a cause code may indicate that a user manually terminated the communication by hanging up the receiver of an endpoint. Exemplary billing tokens generated by various types of communications according to embodiments of the invention are set forth in Appendix A attached hereto. For example, Appendix A sets forth exemplary billing tokens generated when a called party answers and disconnections, when a calling party calls an unknown number, when a busy number is called, when a call is placed to a phone that is listed in the call manager and not registered on the network, and when a call manager is unregistered.

Termination cause codes are, among other things, useful for performing diagnostics on the network, and also for generating billing information. For example, cause codes can be used to filter calls which should not be billed from a set of total calls. In some cases, it might not, for example, be desirable to bill a user for a call which terminated due to network failure or due to a busy signal. Thus, cause codes can be used to ensure that billing occurs only for properly terminated communications such as termination due to user action and other similarly appropriate events.

In some embodiments, call mediators generate alphanumeric cause codes while enterprise gatekeepers and other gatekeepers in packet-switched networks such as VoIP networks, are directed to processing only numeric cause codes. For example, in some embodiments, the gatekeepers process numeric cause codes based on traditional PSTN cause codes as is known in the art. Thus, a DRQ from a call mediator might contain a cause code "no answer from user", however, the enterprise gatekeeper and other components of the VoIP network are directed to processing the cause code when it is formatted as a traditional PSTN cause code "19" for such an event. In such embodiments, the alphanumeric cause codes from the call mediator must be parsed or otherwise translated into formats appropriate for processing by other components of the VoIP network.

Thus, in some embodiments, the enterprise gatekeeper parses the DRQ and the billing token to generate an authentication record, such as a RADIUS record, step 280, which is sent to a remote authentication server, such as RADIUS server, step 285. For example, the enterprise gatekeeper parses the call details from fields of the billing token, and maps this information to corresponding fields in a RADIUS record. Any alphanumeric cause code generated by a call mediator is translated into a PSTN cause code and also incorporated into the RADIUS record.

The remote authentication server parses the authentication record to generate a call detail record, step 290. For example, in some embodiments, a RADIUS record created by the enterprise gatekeeper contains information useful for performing customer billing such as the duration of a communication, identification of the endpoints associated with the communication, the amount of data transferred during the call, a cause code indicating the reason the call was terminated, and other similar information. Thus, information is encoded into a call detail record format suitable for processing by a billing server, and then sent by the authentication server to the billing server for further processing, step 295. For example, in some embodiments, the billing server processes call detail records to generate bills for user communications.

Systems and modules described herein may comprise software, firmware, hardware, or any, combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein. Screenshots presented and described herein can be displayed differently as known in the art to input, access, change, manipulate, modify, alter, and work with information.

While the embodiments of the invention have been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

Section A

The following represent sample billing tokens that are generated by various exemplary communications according to embodiments of the invention:

<<Called party answers and disconnects>>
Mon Nov 19 14:34:35 2001
  NAS-IP-Address=198.92.215.163
  NAS-Port-Type=Async
  User-Name="cm2.evoice-gk1"
  Called-Station-Id="16176871391"
  Calling-Station-Id="7816343121"
  Acct-Status-Type=Stop
  Service-Type=Login-User
  h323-gw-id="h323-gw-id=192.168.3.9"
  h323-conf-id="h323-conf-id=80A9FA23 25FB611D 110031CB C0A80313"
  h323-call-origin="h323-call-origin=originate"
  h323-call-type="h323-call-type=VoIP"
  h323-remote-address="h323-remote-address=198.92.213.49"
  h323-connect-time="h323-connect-time=19:26:58.000 GMT Mon Nov. 19 2001"
  h323-disconnect-time="h323-disconnect-time=19:27:00.000 GMT Mon Nov 19 2001"
  h323-disconnect-cause="h323-disconnect-cause=16"
  Acct-Session-Id="0000005F"
  Acct-Input-Octets=0
  Acct-Output-Octets=0
  Acct-Input-Packets=0
  Acct-Output-Packets=0
  Acct-Session-Time=5
  Cisco-AVPair="pre-bytes-in=0"
  Cisco-AVPair="pre-bytes-out=0"
  Cisco-AVPair="pre-paks-in=0"
  Cisco-AVPair="pre-paks-out=0"
  Cisco-AVPair="nas-rx-speed=0"
  Cisco-AVPair="nas-tx-speed=0"
  Acct-Delay-Time=0
  Client-IP-Address=198.92.215.163

Timestamp=1006198475
Request-Authenticator=None
<<Calling Party calls unknown number>>
Mon Nov 19 14:36:29 2001
  NAS-IP-Address=198.92.215.163
  NAS-Port-Type=Async
  User-Name="cm2.evoice-gk1"
  Called-Station-Id="16176871333"
  Calling-Station-Id="7816343121"
  Acct-Status-Type=Stop
  Service-Type=Login-User
  h323-gw-id="h323-gw-id=192.168.3.9"
  h323-conf-id="h323-conf-id=9FE86A 25FB611D 130031CB C0A80313"
  h323-call-origin="h323-call-origin=originate"
  h323-call-type="h323-call-type=VoIP"
  h323-remote-address="h323-remote-address=198.92.213.49"
  h323-connect-time="h323-connect-time=19:28:54.000 GMT Mon Nov 19 2001"
  h323-disconnect-time="h323-disconnect-time=19:28:54.000 GMT Mon Nov 19 2001"
  h323-disconnect-cause="h323-disconnect-cause=1"
  Acct-Session-Id="00000061"
  Acct-Input-Octets=0
  Acct-Output-Octets=0
  Acct-Input-Packets=0
  Acct-Output-Packets=0
  Acct-Session-Time=0
  Cisco-AVPair="pre-bytes-in=0"
  Cisco-AVPair="pre-bytes-out=0"
  Cisco-AVPair="pre-paks-in=0"
  Cisco-AVPair="pre-paks-out=0"
  Cisco-AVPair="nas-rx-speed=0"
  Cisco-AVPair="nas-tx-speed=0"
  Acct-Delay-Time=0
  Client-IP-Address=198.92.215.163
  Timestamp=1006198589
  Request-Authenticator=None
<<Calls busy number>>
Mon Nov 19 14:38:30 2001
  NAS-IP-Address=198.92.215.163
  NAS-Port-Type=Async
  User-Name="cm2.evoice-gk1"
  Called-Station-Id="16176871391"
  Calling-Station-Id="7816343122"
  Acct-Status-Type=Stop
  Service-Type=Login-User
  h323-gw-id="h323-gw-id=192.168.3.9"
  h323 -conf-id="h323-conf-id=80C107B3 25FB611D 150016C8 C0A80317"
  h323-call-origin="h323-call-origin=originate"
  h323-call-type="h323-call-type=VoIP"
  h323-remote-address="h323-remote-address=198.92.213.49"
  h323-connect-time="h323-connect-time=19:30:55.000 GMT Mon Nov 19 2001"
  h323-disconnect-time="h323-disconnect-time=19:30:55.000 GMT Mon Nov 19 2001"
  h323-disconnect-cause="h323-disconnect-cause=17"
  Acct-Session-Id="00000065"
  Acct-Input-Octets=0
  Acct-Output-Octets=0
  Acct-Input-Packets=0
  Acct-Output-Packets=0
  Acct-Session-Time=0
  Cisco-AVPair="pre-bytes-in=0"
  Cisco-AVPair="pre-bytes-out=0"
  Cisco-AVPair="pre-paks-in=0"
  Cisco-AVPair="pre-paks-out=0"
  Cisco-AVPair="nas-rx-speed=0"
  Cisco-AVPair="nas-tx-speed=0"
  Acct-Delay-Time=0
  Client-IP-Address=198.92.215.163
  Timestamp=1006198710
  Request-Authenticator=None
<<Calls phone not registered. Call exists in CM, but not there.>>
Mon Nov 19 14:39:57 2001
  NAS-IP-Address=198.92.215.163
  NAS-Port-Type=Async
  User-Name="cm2.evoice-gk1"
  Called-Station-Id="16176871397"
  Calling-Station-Id="7816343123"
  Acct-Status-Type=Stop
  Service-Type=Login-User
  h323-gw-id="h323-gw-id=192.168.3.9"
  h323-conf-id="h323-conf-id=807D7BE7 25FB611D 1600EEC2 C0A80314"
  h323-call-origin="h323-call-origin=originate"
  h323-call-type="h323-call-type=VoIP"
  h323-remote-address="h323-remote-address=198.92.213.49"
  h323-connect-time="h323-connect-time=19:32:23.000 GMT Mon Nov 19 2001"
  h323-disconnect-time="h323-disconnect-time=19:32:23.000 GMT Mon Nov 19 2001"
  h323-disconnect-cause="h323-disconnect-cause=41"
  Acct-Session-Id="00000066"
  Acct-Input-Octets=0
  Acct-Output-Octets=0
  Acct-Input-Packets=0
  Acct-Output-Packets=0
  Acct-Session-Time=0
  Cisco-AVPair="pre-bytes-in=0"
  Cisco-AVPair="pre-bytes-outer"
  Cisco-AVPair="pre-paks-in"
  Cisco-AVPair="pre-paks-out=0"
  Cisco-AVPair="nas-rx-speed"
  Cisco-AVPair="nas-tx-speed"
  Acct-Delay-Time=0
  Client-IP-Address=198.92.215.163
  Timestamp=1006198797
  Request-Authenticator=None
<<Call Manager not registered>>
Mon Nov 19 14:47:27 2001
  NAS-IP-Address=198.92.215.163
  NAS-Port-Type=Async
  User-Name="cm1.evoice-gk1 "
  Called-Station-Id ="17816343123"
  Calling-Station-Id ="6176871390"
  Acct-Status-Type=Stop
  Service-Type=Login-User
  h323-gw-id="h323-gw-id=198.92.213.49"
  h323-conf-id="h323-conf-id=80F9FD31 28FB611D 10084CE C65CD526"
  h323-call-origin="h323-call-origin=originate"
  h323-call-type="h323-call-type=VoIP"
  h323-remote-address="h323-remote-address=198.92.215.170"
  h323-connect-time="h323-connect-time=19:39:53.000 GMT Mon Nov 19 2001"
  h323-disconnect-time="h323-disconnect-time=19:39:53.000 GMT Mon Nov 19 2001"

h323-disconnect-cause="h323-disconnect-cause=16"
Acct-Session-Id="00000069"
Acct-Input-Octets=0
Acct-Output-Octets=0
Acct-Input-Packets=0
Acct-Output-Packets=0
Acct-Session-Time=0
Cisco-AVPair="pre-bytes-in=0"
Cisco-AVPair="pre-bytes-out=0"
Cisco-AVPair="pre-paks-in=0"
Cisco-AVPair="pre-paks-out=0"
Cisco-AVPair="nas-rx-speed=0"
Cisco-AVPair="nas-tx-speed=0"
Acct-Delay-Time=0
Client-IP-Address=198.92.215.163
Timestamp=1006199247
Request-Authenticator=None

What is claimed is:

1. A computerized method for monitoring communications in a packet switched network, the method comprising:
   initiating a communication between a network endpoint associated with a call mediator and at least a second network endpoint;
   recording, at the call mediator, information associated with the communication; and
   upon termination of the communication, communicating, from the call mediator to an enterprise gatekeeper, the information associated with the communication in a disconnect request that contains a billing token containing information associated with the communication.

2. The method as recited in claim 1, comprising a call mediator located at a customer site serviced by an enterprise gatekeeper located at a different location.

3. The method as recited in claim 2, comprising a call mediator controlled by a customer and an enterprise gatekeeper controlled by a service provider.

4. The method as recited in claim 3, wherein recording information associated with the communication comprises recording information that is accessible to the customer controlling the call mediator.

5. The method as recited in claim 4, comprising storing, at the enterprise gatekeeper, information associated with the communication.

6. The method as recited in claim 5, wherein the information associated with the communication stored at the enterprise gatekeeper is not accessible to the customer.

7. The method as recited in claim 1 wherein the communication comprises a VoIP communication.

8. The method as recited in claim 1 wherein recording information associated with the communication comprises recording a network identifier associated with a network endpoint.

9. The method as recited in claim 1 wherein recording information associated with the communication comprises recording at least one of:
   a start time of the communication;
   a stop time of the communication;
   a duration of the communication; and
   an amount of data transferred between the network endpoints.

10. A system for monitoring communications in a packet switched network, the system comprising:
    a first network endpoint associated with a call mediator;
    at least a second network endpoint; and
    an enterprise gatekeeper;
    wherein the first network endpoint initiates a communication with the second network endpoint,
    wherein the call mediator records information associated with the communication, and
    wherein upon termination of the communication, the call mediator communicates, to the enterprise gatekeeper, the information associated with the communication in a disconnect request that contains a billing token containing information associated with the communication.

11. The system as recited in claim 10, wherein the call mediator is located at a customer site serviced by an enterprise gatekeeper located at a different location.

12. The system as recited in claim 11, wherein the call mediator is controlled by a customer and the enterprise gatekeeper is controlled by a service provided.

13. The system as recited in claim 12, wherein the information associated with the communication recorded at the call mediator is accessible to the customer controlling the call mediator.

14. The system as recited in claim 13, wherein the enterprise gatekeeper stores the information associated with the communication received from the call mediator.

15. The system as recited in claim 14, wherein the information associated with the communication stored at the enterprise gatekeeper is not accessible to the customer.

16. The system as recited in claim 10 wherein the information associated with the communication comprises at least one of:
    a start time of the communication;
    a stop time of the communication;
    a duration of the communication; and
    an amount of data transferred between the network endpoints.

* * * * *